Sept. 7, 1943.  C. B. JAMISON.  2,328,722

ADJUSTABLE PITCH PROPELLER

Filed July 15, 1941

Inventor
Clarence B. Jamison.

Attorney.

Patented Sept. 7, 1943

2,328,722

UNITED STATES PATENT OFFICE 2,328,722

ADJUSTABLE PITCH PROPELLER

Clarence B. Jamison, Beverly Hills., Calif., assignor of twenty percent to Arthur E. Wright, Beverly Hills, Calif.

Application July 15, 1941, Serial No. 402,449

3 Claims. (Cl. 170—162)

My invention relates to propellers and particularly to adjustable pitch propellers for use on aircraft.

A need has long existed for an adjustable pitch propeller which is efficient yet which can be made within a price range available to users of relatively small airplanes. Such adjustable pitch propellers as have heretofore been known in the art are so designed that their cost of production renders them prohibitive for general use on small planes. For instance, they have been of such structure as to require relatively expensive hub parts built into or integral with the remainder of the devices. Wooden blades are usually employed in adjustable pitch devices and it is well known that the shanks of such blades, which usually are tightly fitted into a metal ferrule, dry out and shrink to an extent that they become objectionably loose. So far as I know, prior to my invention no practicable means have been provided in adjustable pitch propellers for compensating for such shrinkage.

An object of my invention, therefore, is the provision of an adjustable pitch propeller which may be mounted on the hubs provided for conventional wooden fixed-pitch propellers, thus rendering unnecessary special hub elements and parts.

Another object is to provide simple and effective means for adjusting the blade pitch as may be desired.

Another object is the provision of an adjustable pitch propeller in which the blade mountings may be tightened to compensate for shrinkage.

Economy of manufacture, efficiency, strength and durability are other objects and accomplishments of my invention.

My invention is characterized by the parts and combinations of parts hereinafter described and claimed, and for the purpose of making the invention understood I shall now proceed to describe in detail one presently preferred embodiment thereof, making reference to the accompanying drawing, in which:

Figure 1:
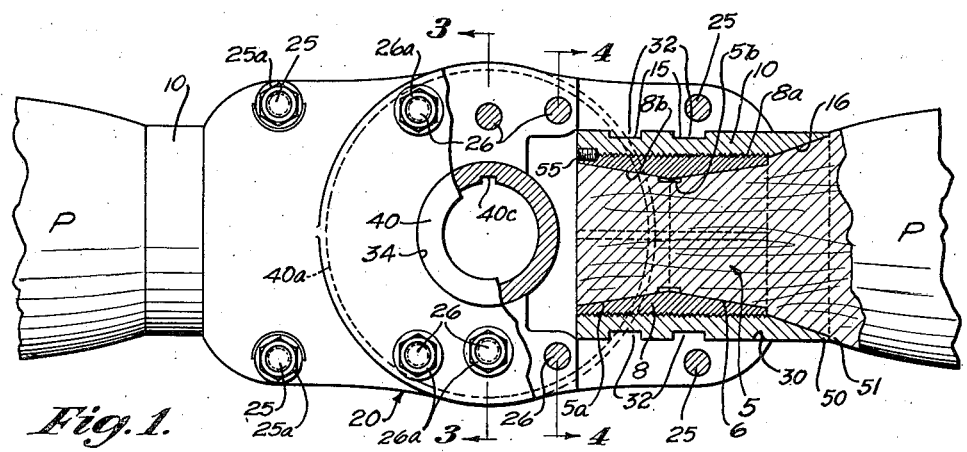
Fig. 1 is a front view partly in section and partly in elevation.

Referring now to the drawing, I show at P a wooden propeller blade having a shank 5 provided with an annular recess 6 of V-shaped longitudinal section. Within the recess 6 there is fitted a split sleeve 8 having a screwthreaded outer surface 8a and an inner surface 8b of V-shaped longitudinal section. Shank 5 and sleeve 8 are housed within an internally threaded ferrule 10 which has annular recesses 15 and a tapered outer end 16 conforming to the taper of the blade between the shank and the airfoil portion of the blade. While I have only described one blade P, one split sleeve 8 and one ferrule 10, it will be understood that there are two sets of said elements oppositely radially disposed in the barrel or housing element 20 now to be described.

The barrel element 20 is comprised of two oppositely disposed parallel segments 20a and 20b clamped together by bolts 25, 26 and nuts 25a, 26a. Bolts 25 extend through transverse openings provided in bosses 27. Each of those segments has oppositely disposed registering recesses 30 so that when the two segments are placed together face to face said recesses form longitudinal bores to receive the ferrules 10, one at each end of the barrel element. The segments have inner annular projections 32 which snugly fit into the annular recesses 15 to hold said ferrules against longitudinal escape from the barrel.

Each of the segments 20a, 20b has a central transverse bore 33, 34 to receive a metal hub 40 having an annular attaching flange 40a provided with bolt receiving holes 40b. The hub per se is of the conventional type commonly sold as an airplane engine accessory for securing on the drive shaft a conventional wooden propeller of fixed pitch, the hub being splined at 40c for keying onto the motor drive shaft, not shown. The front end of the hub is internally recessed at 40d to receive the usual puller ring, not shown.

As said before, wooden propeller shanks usually shrink in time and become relatively loose in their mountings, this shrinkage being particularly prevalent in relatively dry climates. In my device, this shrinkage may be compensated for by rotating threaded ferrule 10 on threaded sleeve 8, thus causing the tapered inner surface 8b of sleeve 8 to move towards the inner end of the propeller shank (that end towards the hub) whereby to bear more tightly against the oppositely tapered portion 5a of the shank, and causing the peripheral edge 50 of the ferrule to move outwardly against the annular shoulder 51 provided on the blade. To facilitate such longitudinal movement of sleeve 8 with respect to the shank, the central portion of the annular recess 6 is annularly cut away as shown at 5b.

Figures 3, 4:
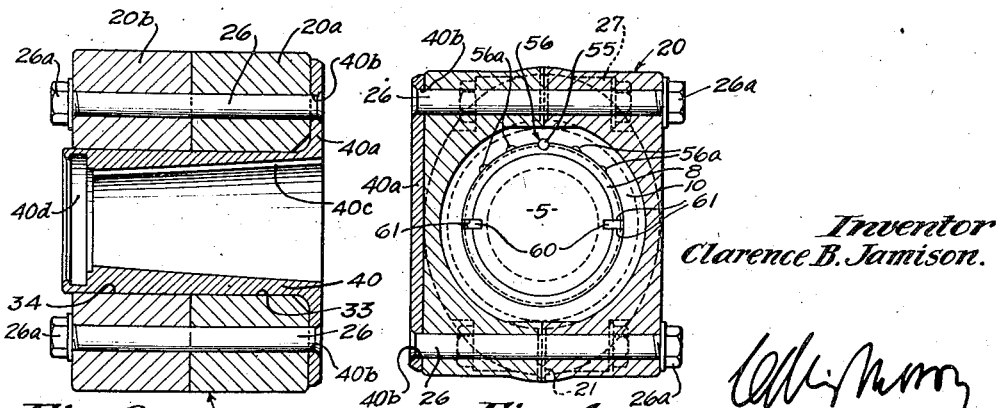
Fig. 3 is a section on line 3—3 of Fig. 1.
Fig. 4 is a section on line 4—4 of Fig. 1.

The sleeve 8 is normally held against rotation with respect to ferrule 10 by means of the threaded key 55 being screwed in the threaded keyway 56, one half of the keyway being in the inner surface of ferrule 10 and the other registering half being in the outer surface of sleeve 8. As shown in Fig. 4, I provide a plurality of circumferentially spaced keyways 56a in ferrule 10 so as to provide registering keyway segments after some relative rotation of ferrule 10 with respect to sleeve 8 has taken place for the tightening purposes just described.

While the propeller shank normally has a tight enough fit in sleeve 8 to prevent rotation of the propeller blade with respect to the sleeve, I may additionally provide positive means for preventing such rotation by having a pair of diametrically opposite keys 60 embedded longitudinally in blade shank 5 and projecting into keyways provided along the splits 61 in split sleeve 8.

Figure 2:
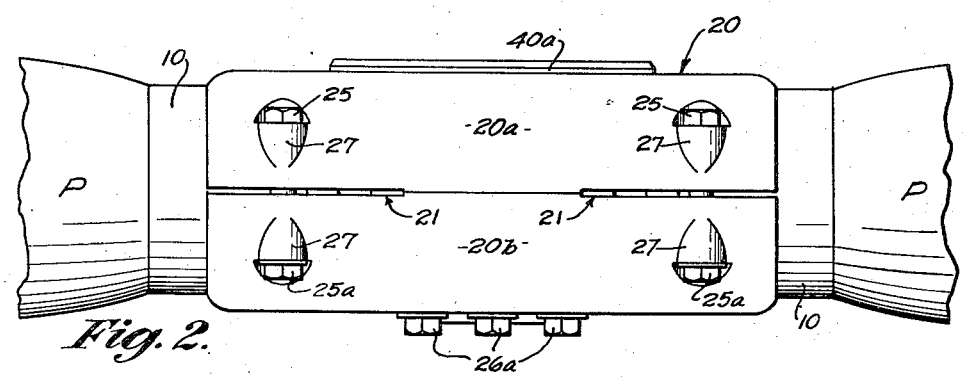
Fig. 2 is a plan view.

The ferrules 10, with their carried blades, are held in clamped position between the parallel barrel segments 20a, 20b by means of the clamping bolts 25, 26, the inner face of each of the segments being cut away somewhat adjacent the opposite ends as shown at 21 in Fig. 2, to facilitate such clamping action.

From the foregoing description it will be seen that in order to change the pitch of the propeller blades, it is only necessary to loosen nuts 25a, 26a sufficiently to permit the ferrules 10, with their carried blades, to be rotated until the blades have the desired pitch, after which the clamping nuts are again tightened to secure the ferrules against further rotation.

My device may be mounted on any conventional fixed pitch propeller hub by simply sliding the hub into the bores 33, 34 and applying the bolts 26 through the holes in the hub flange 40a and through the registering holes provided in segments 20a and 20b and applying the nuts 26a.

While I have resorted to considerable detail in describing these particular adaptations, I have done so only to make my invention clearly understandable and I wish it understood that, within the broader scope of the invention as defined by the following claims, other modifications and adaptations are possible.

I claim:

1. In a device of the class described, an airplane propeller blade presenting a shank having a tapered annular surface and a shoulder adjacent the shank, an externally threaded sleeve on the shank, said sleeve having an inner surface tapered oppositely with respect to and fitting against the taper of said annular surface, a ferrule threadedly mounted on the sleeve and having an end portion engaging said shoulder, said respective tapered surfaces of the shank and sleeve being engageable against each other in response to rotation of the ferrule with respect to the sleeve, a housing, and means rotatably adjustably securing the ferrule in the housing.

2. In a device of the class described, an airplane propeller blade having a beveled shank, an internally beveled sleeve on the shank, said sleeve being longitudinally slotted to provide a keyway, a key mounted in the shank and projecing into the keyway whereby said sleeve and key are movable longitudinally with respect to each other, a ferrule threadedly mounted on the sleeve, a housing, means rotatably adjustably securing the ferrule in the housing, and means responsive to rotation of the ferrule on the sleeve for moving the sleeve longitudinally on the shank whereby to adjust the fit of the shank in the sleeve.

3. In an airplane propeller of the class described, the combination of a hub, a barrel disposed radially of the hub, a blade-receiving bore in the barrel, a blade presenting a shank tapering from its inner end and a shoulder adjacent the outer end of the shank, said shank being housed within the barrel, an externally threaded, longitudinally divided sleeve mounted on and conforming to the shank and having its inner end spaced from the inner end of the bore, a ferrule threaded onto the sleeve and having its outer end bearing against the shoulder whereby upon relative rotation as between the ferrule and sleeve the ferrule will compress said shoulder and the sleeve will move towards the inner end of the bore of the barrel and compress the tapered portion of the shank, and means securing the ferrule against outward longitudinal movement with respect to the barrel.

CLARENCE B. JAMISON.